United States Patent [19]
Sano et al.

[11] Patent Number: 5,429,652
[45] Date of Patent: Jul. 4, 1995

[54] MOLD FOR MOLDING GLASS HAVING A NICKEL AND GRAPHITE SURFACE COATING

[75] Inventors: Hiroki Sano, Yokosuka; Tateyuki Sasaki, Kashiwa; Akira Kobayashi, Yokohama, all of Japan

[73] Assignee: Toyo Seikan Kaisha, Ltd., Tokyo, Japan

[21] Appl. No.: 228,003

[22] Filed: Apr. 15, 1994

Related U.S. Application Data

[63] Continuation of Ser. No. 931,385, Aug. 18, 1992, abandoned.

[30] Foreign Application Priority Data

Aug. 19, 1991 [JP] Japan ................... 3-230797

[51] Int. Cl.$^6$ .................. C03B 9/00; C03B 40/00; B28B 7/36; B29C 33/56
[52] U.S. Cl. ................. 65/374.11; 65/374.15; 249/114.1; 249/115
[58] Field of Search ............. 249/114.1, 115; 65/374.11, 374.15, 213, 214, 303

[56] References Cited

U.S. PATENT DOCUMENTS

| | | | |
|---|---|---|---|
| 3,349,831 | 10/1967 | Moore et al. | 249/115 |
| 3,745,096 | 7/1973 | Fournier | 249/115 |
| 3,792,986 | 2/1974 | Scott et al. | 249/115 |

FOREIGN PATENT DOCUMENTS 63-100027  5/1988  Japan .

Primary Examiner—W. Gary Jones
Assistant Examiner—Steven P. Griffin
Attorney, Agent, or Firm—Sughrue, Mion, Zinn, Macpeak & Seas

[57] ABSTRACT

Water-soluble high molecules are made present as a dispersing agent in a dispersion coating bath of a solution of a water-soluble nickel salt containing graphite dispersed therein, and a mold for molding a glass is immersed therein in a manner that the mold serves as the cathode and the nickel metal serves as the anode in order to effect the plating while suppressing nickel or a nickel-based alloy in the film from growing in a vertical direction or in the direction of the plane thereof. On the inner surfaces of the mold is formed a film which comprises a matrix of nickel or the nickel-based alloy which as a whole has a flake-like form that is continuous and exists in an open cellular form and a graphite granule phase which is held in the open cells and is outwardly exposed on the surface. Since nickel is suppressed from growing like granules, the film exhibits excellent lubricating property, heat resistance, parting property, abrasion resistance and durability in combination, and is free from defects inherent in the prior art.

6 Claims, 1 Drawing Sheet

MOLD FOR MOLDING GLASS HAVING A NICKEL AND GRAPHITE SURFACE COATING

This is a Continuation of application Ser. No. 07/931,385, filed Aug. 18, 1992, now abandoned.

BACKGROUND OF THE INVENTION

(1) Field of the Invention

The present invention relates to a mold for molding a glass and to a method of producing the same. More specifically, the invention relates to a mold which is used for molding a parison from a molten glass (gob), and which features long life, excellent moldability and smoothness of the glass molded articles.

(2) Description of the Prior Art

In a step of molding a glass, masses of glass melted at a high temperature are thrown into a mold (blank mold and neck ring). In this case masses of glass do not often completely flow into the mold or wrinkles develop due to frictional resistance relative to the mold. In order to prevent this as well as to easily remove the glass molded into the shape of a parison from the mold, an oil (swabbing compound) containing graphite is applied onto the inner surfaces of the mold maintaining an interval of several tens of minutes. However, since the mold is usually heated at a temperature as high as about 500° C., oil soot generates to deteriorate the working environment. Moreover, the graphite applied in excess amounts adheres to the surfaces of the glass container causing the products to be fouled and deteriorating the yields of the products.

In order to solve these problems, there have been proposed a variety of lubricating/parting agents to substitute for the swabbing compounds. For instance, Japanese Laid-Open Patent Publication No. 127111/1976 discloses a lubricating/parting agent used in an apparatus for producing glass containers, comprising 5 to 30% by weight of graphite or a mixture of graphite and a boron nitride, 5 to 30% by weight of at least one compound selected from the group consisting of aluminum biphosphate, aluminum primary phosphate and magnesium biphosphate, and 40 to 90% by weight of an aqueous solution containing acid.

In order to impart lubricating/parting property to the inner surface of the mold, furthermore, Japanese Laid-Open Patent Publication No. 10207/1974 discloses a mold for molding glass articles in which a nickel film containing phosphorus in an amount of 3 to 13% by weight is nonelectrolytically plated onto the inner surfaces of the mold maintaining a thickness of 5 to 300 $\mu$m.

Japanese Laid-Open Patent Publication No. 100027/1980 filed by the present inventors discloses a mold for molding a glass wherein the inner surfaces of the mold are coated with a film in which are dispersed graphite granules using nickel or a nickel-based alloy comprising chiefly nickel as a matrix.

However, the former-lubricating/parting agent is yet poor in regard to heat resistance and abrasion resistance, and has a life of about 1 to 3 days. The alloy coating method mentioned above is excellent in regard to durability of the film but still has a problem with respect to lubricating property which is very poor.

The latter nickel film dispersed with graphite exhibits excellent lubricating property and durability compared with those of the above prior art, but still tends to develop fine scars on the glass surfaces. The scars on the surface of the molded glass gradually increase after used for extended periods of time.

That is, the film of the graphite-dispersed nickel plating exhibits excellent lubricating property possessed by graphite and excellent heat resistance and abrasion resistance possessed by nickel. In effecting the dispersive plating, however, the nickel layer plated on the surfaces of the mold greatly grow like granules in a direction perpendicularly to the surface of the mold. Thus, scars develop in the surface of the glass being caused by nickel that undergo granular growth.

SUMMARY OF THE INVENTION

The object of the present invention therefore is to provide a mold for molding a glass in which nickel or a nickel-based alloy comprising chiefly nickel serving as a matrix and graphite granules are dispersively plated on the inner surfaces of the mold for molding a glass, wherein granular growth of nickel is suppressed in order to obtain excellent lubricating property, heat resistance, parting property, abrasion resistance and durability in combination, eliminating the aforementioned defects in the prior art. The invention further provides a method of producing such a mold.

According to the present invention, there is provided a mold for molding a glass the inner surfaces of which being coated with nickel or a nickel-based alloy comprising chiefly nickel and with graphite granules, wherein said coated film comprises a matrix of nickel or a nickel-based alloy that exists in the form of open cells and a graphite granule phase that is held in said open cells and is outwardly exposed on the surface, and said nickel or said nickel-based alloy exists in the form of thin flakes on a vertical cross section of the film in the direction of the plane thereof and in a direction perpendicular thereto in a number of several percent to greater than 50 percent and having flake lengths of not greater than 20$\mu$m.

According-to the present invention, furthermore, there is provided a method of producing a mold for molding a glass comprising immersing the mold for molding a glass in a dispersion coating bath containing a solution of a water-soluble nickel salt with graphite being dispersed therein in a manner that the mold serves as the cathode and the nickel metal serves as the anode, and flowing an electric current in order to precipitate nickel as well as graphite, wherein water-soluble high molecules are made present as a dispersing agent in the dispersion coating bath in order to suppress the growth of nickel or nickel-based alloy in the film in the perpendicular direction and in the direction of the plane thereof. A preferred example of the water-soluble high molecules is an anionic high molecular dispersing agent. Particularly distinguished effects are obtained when graphite granules are used being treated in advance.

DETAILED DESCRIPTION OF THE INVENTION

Figure 1:
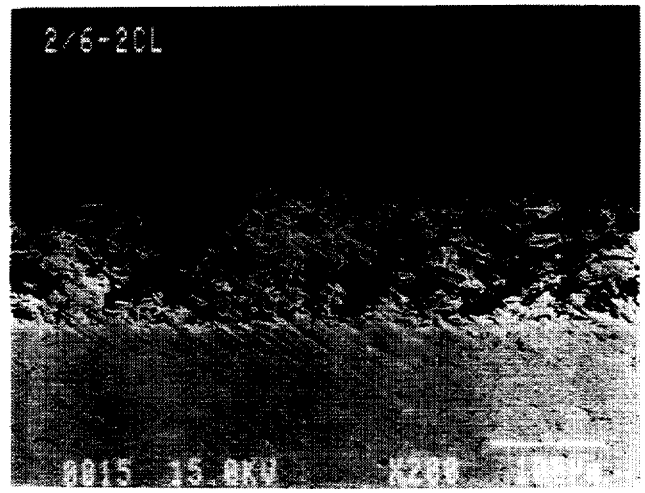
FIG. 1 is a electron microphotograph of the inner surface in cross section of a metal mold for molding a glass according to the present invention.

According to the present invention, the inner surfaces of the mold are coated with a film of nickel or a nickel-based alloy comprising chiefly nickel and graphite granules by the nickel-graphite dispersion coating, The reason is because this film exhibits excellent lubricating property, heat resistance, parting property and abrasion property in combination at the time of molding a glass.

As pointed out already, however, the film formed by the nickel-graphite dispersion coating exhibits excellent lubricating property possessed by graphite and excellent heat resistance and abrasion resistance possessed by nickel. In effecting the dispersion coating, however, the nickel-plated layer tends to grow like granules in a direction perpendicularly to the surface of the mold or further in the direction of the plane thereof, and fine scars inevitably develop in the surface of the glass due to nickel that has grown like granules.

According to the present invention, it was discovered that when water-soluble high molecules are present as a dispersing agent in a dispersive plating bath which contains a solution of a water-soluble nickel salt with graphite being dispersed therein, nickel or the nickel-based alloy in the film suppressed from growing in the perpendicular direction or in the direction of the plane thereof, and a film having a novel and fine structure is formed on the surfaces of the mold for molding a glass.

The film that exists on the surface of the mold for molding a glass according to the present invention comprises (1) a matrix of nickel or a nickel-based alloy (hereinafter simply referred to as nickel) which is of the form of thin flakes and is continuous as a whole but exists in the form of open cells, and (2) a graphite granule phase which is held in the open cells and is outwardly exposed on the surface. Even in this dispersively plated film, the nickel matrix is formed through a step in which nickel granules precipitated by plating on the nickel granules undergo granular growth. Therefore, the nickel matrix as a whole is in a continuous form. In the film of the present invention, however, the nickel is suppressed from growing like granules in the perpendicular direction or in the direction of the plane, but assumes the form of thin flakes and exists in the form of open cells, creating a distinguished feature. The open cell stands for a structure of a wall (cell) found in a communicating bubble-type foamed material:—though the walls are continuous, there necessarily exist open portions. Graphite granules are held in the open cells consisting of nickel, and are further outwardly exposed on the surface of the film.

The accompanying FIG. 1 is an electron microphotograph (magnification, 200 times) of the cross section of the surface of the mold for molding a glass of the present invention, wherein the lower continuous portion is an underlying metal, the white thin flake-like portions in the upper film represent nickel-plated layer, and grey granules represent a graphite granule phase. It will be well comprehended from this drawing that the film on the mold for molding a glass of the present invention has the fine structure as described above.

As will be understood from FIG. 1, the nickel-plated layer or the matrix has the form of thin flakes of not more than 20 $\mu$m on a vertical cross section of the film in the direction of the plane thereof and in a direction perpendicular thereto in a number of at least 50 percent of the entire number.

In this specification, the flake length stands for that of the nickel-plated layer that is found by taking a photograph of the cross section of the film using a scanning electron microscope (SEM) and subjecting it to an image processor. The magnification of the SEM image is 700 times, and the cutting width of the image processing is 0.3 $\mu$m.

In the film on the surface of the mold for molding a glass of the present invention, nickel exists in the form of fine open cells and graphite granules are held in the cells. Therefore, the film has a mechanically rigid structure and exhibits excellent abrasion resistance, durability and heat resistance. Moreover, the graphite granules that are outwardly exposed through the open cells exhibit excellent lubricating property stably for extended periods of time. Moreover, since nickel exists in the form of thin flakes, molded articles of glass are not scratched even when the film is worn out; i.e., the molded articles of glass are permitted to have smooth and excellent appearance.

In the method of the present invention, the fact was discovered as a phenomenon in that a high molecular dispersing agent blended in the dispersively plating bath suppresses the nickel from growing like granules in a direction perpendicular to the film surface and in the direction of the plane thereof, and brings about open cellular form and thin flake structure. Though the reason is not yet obvious, it is considered that the high molecular dispersing agent present in the plating bath promotes the graphite granules to adhere to the active points of the plated nickel that grows like granules.

Particularly great effect for suppressing the growth of granules is exhibited when an anionic high molecular dispersing agent is used as the high molecular dispersing agent probably due to the fact that graphite granules precipitate on the above-mentioned active points through the anionic dispersing agent. Because of this reason, the graphite granules are better treated in advance with the anionic high molecular dispersing agent.

DESCRIPTION OF THE PREFERRED EMBODIMENTS (Mold for molding a glass)

Examples of the mold include any molds such as blank mold, finish mold, neck ring, bottom plate, baffle, press mold, etc. that are used for the production of bottle or jar, parisons thereof, dishes or any other molded articles by putting a mass of molten glass or a so-called gob to such a molding method as press molding, blow molding, press and blow process or blow and blow process.

(Dispersive plating)

The film is formed on the above-mentioned mold relying upon the dispersive plating method that will be described below in detail. First, prior to effecting the dispersive plating, the inner surfaces of the mold are cleansed by dewaxing with an alkali, washing with an acid, polishing with emery, or shot blasting. The mold is immersed in the plating bath in a manner that the mold serves as a cathode and nickel serves as an anode which are opposed to each other, and an electric current is permitted to flow, so that graphite is precipitated together with nickel to form a film. In this case, what is important is that the water-soluble high molecular dispersing agent and, in particular, the anionic high molecular dispersing agent is made present in the dispersive plating bath.

The water-soluble high molecular dispersing agent is extensively used for the purpose that the granules are stably dispersed or suspended in the aqueous medium. According to the present invention, however, the above dispersing agent is used not only to improve the dispersion or suspension property but also to suppress the nickel-plated layer from growing like granules in a predetermined direction, which is a quite different action.

Preferred examples of the water-soluble high molecular dispersing agent include anionic water-soluble polymers such as carboxymethyl cellulose, carboxymethyl starch, alginate, maleic acid-vinyl ether copolymer, (meth)acrylic acid-(meth)acrylic acid ester copolymer, (meth)acrylic acid-vinyl acetate copolymer, cellulose derivatives obtained by graft-polymerizing (meth)acrylic acid or (anhydrous) maleic acid, partly or completely saponified vinyl polyacetate, and other polymers.

Examples of the water-soluble high molecular dispersing agent may further include other water-soluble high molecules such as methyl cellulose, ethyl cellulose, hydroxyethyl cellulose, hydroxypropyl cellulose, starch, cyanoethylated starch, polyvinyl alcohol, casein, polyvinyl ether, polyethylene glycol, gum arabi, polyvinyl pyrrolidone, and the like, which may be used alone or in combination.

In the present invention, it is desired to use an anionic water-soluble high molecular dispersing agent from the standpoint of effectively suppressing the granular growth of the nickel-plated layer in the direction of height of further in the direction of the plane. The anionic dispersing agent has anionic groups such as sulfonic acid group, phosphoric acid group or like groups. However, those dispersing agents having anionic groups other than carboxylic acid groups such as sulfonic acid group or phosphoric acid group, may contaminate the graphite granules. It is therefore desired to use the dispersing agent having carboxylic group as anionic group. The high molecular dispersing agent may have other hydrophilic groups such as hydroxyl group, ether group, ester group and like groups.

When expressed as a mol number per a unit weight, the concentration of the carboxyl groups in the water-soluble high molecular dispersing agent should range from 100 to 1200 millimols/100 g, and particularly from 200 to 1000 millimoles/100 g. When the concentration of the carboxyl groups lies outside the above-mentioned range, small effect is exhibited for suppressing the granular growth of the nickel layer. The molecular weight of the water-soluble high molecular dispersing agent should be as great as what is generally regarded to be high molecules, such as 1000 or greater and, particularly, 2000 or greater. The counter ions of the anionic water-soluble high molecular dispersing agent, i.e., cations constituting the base, may be any cations. From the standpoint of preventing the graphite granules from being contaminated and of improving the heat resistance and durability, however, the cations should desirably be those of an ammonium salt or an amine salt. Even in case adhered to the film, the cations of these salts easily diffuse upon heating and do not contaminate graphite granules.

Examples of amines constituting salt include alkylamines such as trimethylamine, triethylamine and n-butylamine, and alcoholamines such as 2-dimethylamino ethanol, diethanolamine, triethnolamine, aminomethylpropanol and dimethylaminomethylpropanol. There can further be used polyhydric amines such as ethylene diamine, diethylene triamine, and the like. There can further be preferably used an amine having a branched-chain alkyl group and a heterocyclic amine. Examples of the amine having branched-chain alkyl group include branched-chain alkylamines having 3 to 6 carbon atoms and, particularly, 3 to 4 carbon atoms such as isopropylamine, sec-butylamine, tert-butylamine, isoamylamine and the like. Examples of the heterocyclic amine include saturated heterocyclic amines having a nitrogen atom such as pyrrolidene, piperidine, morpholine, and the like.

Ammonia and amines should desirably be used in amounts of at least 0.3 chemical equivalent and, particularly, in amounts of from 0.7 to 1.3 chemical equivalent with respect to the carboxyl groups of the water-soluble high molecular dispersing agent.

In the film of the present invention, graphite should exist in an amount of from 5 to 70% by weight and, preferably, in an amount of 10 to 50% by weight with respect to the whole amount. When the amount of graphite is smaller than the above-mentioned range, the film loses lubricating property. When the amount of graphite exceeds the above range, on the other hand, the film becomes brittle and loses abrasion resistance.

Examples of graphite include a variety of natural graphites and synthetic graphites. Generally, however, it is desired to use a natural graphite having a grain size of from 0.3 to 90 μm. When the grain size is smaller than the above range, the granules tend to be coagulated. When the particle size is greater than the above range, on the other hand, the film adheres less intimately to the metal and further becomes brittle. Most preferably, the graphite should have a particle size within a range of from 0.3 to 20 μm.

According to the present invention, the graphite should not be reduced by more than 50% by weight when it is exposed to the open air heated at 550° C. for 24 hours, from the standpoint of maintaining lubricating property of the film despite the lapse of time. Loss of graphite granules due to oxidation is greatly affected by the presence of alkali metals, alkaline earth metals, metal oxides or metal salts that are contained in graphite since they work as a catalyst. The life of the film can be extended by using graphite granules which are highly purified to contain ash components in amounts smaller than 100 ppm.

The matrix may be made of nickel or a nickel-based alloy comprising chiefly nickel. An example of the nickel-based alloy may be the one which consists of nickel and at least one of such alloy elements as P, B, Co, Mo, Cr, W and Fe. These alloy elements may be contained in amounts of 0 to 40% by weight and, particularly, in amounts of 0.2 to 30% by weight with respect to the alloy. A preferred example of the nickel-based alloy may be a nickel-phosphorus alloy in which the atomic ratio of nickel to phosphorus ranges from 99.5:0.5 to 80:20 (on the basis of weight). This nickel-phosphorus alloy exhibits particularly excellent abrasion resistance.

The dispersion coating bath employed in the present invention contains the above-mentioned nickel or nickel-based alloy component, graphite and water-soluble high molecular dispersing agent as essential components. As nickel or nickel alloy component, there can be used water-soluble salts such as of nickel or the like. As the plating bath, there can be used any known bath such as Watts bath, sulfamic acid bath or chloride bath. In this case, an Ni-P alloy-plated film can be formed if phosphorous acid, hypophosphorous acid or salts thereof are added to the plating bath. The plating bath may, of course, be blended with a variety of plating additives which are known per se, such as a variety of surfactants and, particularly, nonionic surfactants in order to improve dispersing property of the graphite.

According to the present invention, the water-soluble high molecular dispersing agent should be used in an amount of 2 to 50 parts by weight and, particularly, 5 to 30 parts by weight with respect to 100 parts by weight of graphite that is used. A representative example of the plating bath composition is described below.

| Component | General range | Preferred range |
|---|---|---|
| Water-soluble nickel salt | 50 to 300 g/l | 100 to 200 g/l |
| Phosphorous acid | 0 to 40 g/l | 3 to 10 g/l |
| Boric acid | 0 to 80 g/l | 20 to 50 g/l |
| Water-soluble high molecular dispersing agent | 0.1 to 25 g/l | 0.5 to 12 g/l |
| Surfactant | 0 to 20 mg/l | 3 to 10 mg/l |
| Graphite | 5 to 50 g/l | 10 to 40 g/l |
| pH | 1.5 to 4 | 2 to 3.5 |

To effect the dispersion coating, the mold to be treated is immersed in the plating bath in a manner that the mold serves as a cathode and a nickel rod serves as an anode, and an electric current is permitted to flow to form a predetermined film. The current density should generally range from 0.5 to 10 A/dm$^2$ and, particularly, from 1 to 8 A/dm$^2$ The voltage for plating should be so selected as to create the above current density, and generally ranges from 0.5 to 5 V.

In order that the film contains graphite in large and uniform amounts, the surface of the mold to be coated is placed on the lower side with respect to the anode to utilize the sedimentation tendency of graphite granules for the codeposition. In order that the interior of cavity of the mold is uniformly plated (codepositon), the plating operation is carried out while shaking the mold up and down with the anode as a center. Furthermore, the stirring operation is intermittently carried out since the graphite granules precipitate little if the liquid continues to flow. It is further recommended to disperse the deposited graphite granule layer again after every predetermined time interval, since an increase in the deposited amount of graphite granules due to precipitation makes the formation of a dense film difficult. This is accomplished by effecting the above stirring operation.

(Mold for molding a glass)

According to the present invention, the graphite-dispersed nickel film plates on the inner surfaces of the mold should usually have a thickness of from 10 to 600 μm. When the thickness is smaller than 10 μm, the film is not desirable from the standpoint of durability. When the thickness is greater than 600 μm, on the other hand, difficulty is involved from the standpoint of forming the film and an economical point of view.

According to the present invention as described above, the graphite-dispersed nickel film plated on the inner surfaces of the mold, i.e., formed on the surfaces to which the molten glass comes in contact, comprises a matrix of nickel or a nickel-based alloy which as a whole has a flake-like form that is continuous and exists in the form of open cells and a graphite granule phase that is held in the open cells and is outwardly exposed on the surface.

It is essential that nickel or the nickel-based alloy exists in the form of flakes in a number of several percent to greater than 50 percent on the vertical cross section of the film in the direction of plane thereof and in a direction perpendicular thereto, the flake length being smaller than 20 μm. More preferably, nickel or the nickel-based alloy should exist in the form of granules having such a particle size that the number thereof is from several percent to greater than 20 percent in the direction of the plane thereof and in a direction perpendicular thereto, the granules having a flake length of smaller than 10 μm. Moreover, nickel or the nickel-based alloy should occupy 70 to 20% of the area on the cross section of the film.

The lubricating property due to graphite is strongly exhibited in the direction of plane of a carbon 6-member ring (generally, in the direction of plane of a crystal). On the film surface, therefore, the graphite granules should be distributed in a number of several percent to greater than 50% having an angle of inclination of the graphite plane of smaller than 30 degrees from the direction of the film surface. Such a film can be easily formed by suitably precipitating the graphite and by preventing the graphite from coagulating.

Next, working examples of the present invention will be described.

EXAMPLES

Mold Example 1

A mold was dewaxed with a 1,1,1-trichloroethane, electrolytically dewaxed in an electrolytic dewaxing solution containing 40 g of sodium hydroxide per a liter at a temperature of 50° C. with a cathode current density of 5 A/dm$^2$ for one minute, washed with water, and was then washed with an acid by immersing it in a 5% hydrochloric acid solution at room temperature for 5 seconds. After further washed with water, the mold was horizontally set in a plating bath having a pH of 2.5, a temperature of 65° C. and the below-described bath composition and graphite in a manner that the inner surface (to be plated) of the mold was faced upwards and that an anode nickel rod was located at the center of the inner surface of the semi-cylindrical mold, and the plating was effected with a current density of 5 A/dm$^2$ for 30 minutes. While the plating was being effected, the plating bath was stirred at a speed of revolution of 600 rpm for three seconds. The stirring was then discontinued for 15 seconds. The above operations were repeated. Furthermore, the mold was tilted by 45 degrees toward the right with the anode as a center when the stirring was effected. At the next moment of stirring, the mold was so tilted that the inner surface thereof faced upwards and at the next moment of stirring, the mold was then tilted by 45 degrees toward the left. Thus, the mold was intermittently and reciprocally turned from the rightwardly tilted angle of 45 degrees to the leftwardly tilted angle of 45 degrees in a manner of 45 degrees toward the right, 0 degree, 45 degrees toward the left, 0 degree in synchronism with the stirring operation. Moreover, a homogenizer was applied to the plating bath in order to prevent graphite from coagulating.

| Plating bath. | | |
|---|---|---|
| Bath composition | | |
| Hexahydrated nickel sulfate | | 200 g/l (118 g/l) |
| Hexahydrated nickel chloride | | 100 g/l (55 g/l) |
| Boric acid | | 40 g/l |
| Phosphorous acid | | 5 g/l |
| Carboxymethyl cellulose | | 2.5 g/l |
| SD-1 (Okuno Seiyaku Co.) | | 7 ml/l |
| Graphite | | 25 g/l |
| Graphite | Average particle size | 5 μm |
|  | Ash | 50 ppm |
|  | Iron content | 30 ppm or smaller |

-continued

| Plating bath. | |
|---|---|
| Alkali metal + alkaline earth metal | 10 ppm or smaller |

Values in parentheses represent those reckoned as anhydrates.

Mold Example 2

The mold was dewaxed with a 1,1,1-trichloroethane, polished on its surfaces to be plated with emery, and was set horizontally in the plating bath having the same bath composition, and graphite conditions as those of Mold Example 1 such that the inner surface of the mold was faced upwards and that the anode nickel rod was located at the center of the inner surfaces of the semi-cylindrical mold, and was plated with a current density of 5 A/dm² for 30 minutes while stirring the plating bath at a speed of revolution of 800 rpm maintaining an on-off interval of 3 seconds on and 15 seconds off and tilting the mold in synchronism with the stirring operation in the same manner as in Mold Example 1. Further, the homogenizer was applied prior to effecting the plating.

Mold Example 3

The plating was effected under the same conditions, i.e., same pretreatment, bath composition, graphite conditions as those of the Mold Example 1, with the exception of employing a current density of 1 A/dm² for a period of 150 minutes.

Mold Example 4

The plating was effected under the same conditions as those of Mold Example 1 but changing the stirring and mold revolution interval into a 3 second-on-5 second-off cycle.

Mold Example 5

The pretreatment was carried out under the same conditions as in Mold Example 1, and the plating was effected in a plating bath having a pH of 3, a temperature of 55° C. and the below-described bath composition (homogenized prior to effecting the plating) and graphite under the same conditions (stirring, stirring and mold interval, current density and time) as those of Mold Example 1.

| Plating bath. | | |
|---|---|---|
| Bath composition | | |
| Hexahydrated nickel sulfate | | 160 g/l (94 g/l) |
| Hexahydrated nickel chloride | | 120 g/l (66 g/l) |
| Boric acid | | 40 g/l |
| Phosphorous acid | | 5 g/l |
| Polyvinyl alcohol | | 2 g/l |
| SD-1 (Okuno Seiyaku Co.) | | 7 ml/l |
| Graphite | | 30 g/l |
| Graphite | Average particle size | 3 μm |
| | Ash | 70 ppm |
| | Iron content | 30 ppm or smaller |
| | Alkali metal + alkaline earth metal | 10 ppm or smaller |

Mold Example 6

The pretreatment was carried out under the same conditions as in Mold Example 1, and the plating was effected under the following plating conditions by setting the mold in the plating bath having the below-described bath composition, conditions and graphite in the same manner as in Mold Example 1.

| Plating bath. | | |
|---|---|---|
| Bath composition | | |
| Hexahydrated nickel sulfate | | 180 g/l (106 g/l) |
| Hexahydrated nickel chloride | | 40 g/l (22 g/l) |
| Boric acid | | 40 g/l |
| Phosphorous acid | | 7 g/l |
| Methyl cellulose | | 2.5 g/l |
| SD-1 (Okuno Seiyaku Co.) | | 7 ml/l |
| Graphite | | 20 g/l |
| Bath condition. | Bath temperature | 60° C. |
| | Bath pH | 2.5 |
| | Homogenized in advance | |
| Graphite | Average particle size | 10 μm |
| | Ash | 40 ppm |
| | Iron content | 30 ppm or smaller |
| | Alkali metal + alkaline earth metal | 10 ppm or smaller |
| Plating condition | Stirred at 700 rpm maintaining an interval of 3 second-on and 10 second-off cycle. | |
| Mold rotated | Title intermittently toward the right and left by 45 degrees like in Mold Example 1, and the plating was effected for 37 minutes. | |

Comparative Mold Example 1

The plating was effected under the same pretreatment, bath composition and graphite conditions as those of Mold Example 1 but continuously tilting the mold by 45 degrees toward the left and right (5 rpm).

Comparative Mold Example 2

The plating was effected under the same pretreatment and graphite conditions as those of Mold Example 1 but employing the following plating bath composition.

| Plating bath. | |
|---|---|
| Bath composition | |
| Hexahydrated nickel sulfate | 200 g/l (118 g/l) |
| Hexahydrated nickel chloride | 100 g/l (55 g/l) |
| Boric acid | 40 g/l |
| Phosphorous acid | 5 g/l |
| SD-1 (Okuno Seiyaku Co.) | 7 ml/l |
| Graphite | 25 g/l |
| Bath temperature | 60° C. |
| Bath pH | 2.5 |

Comparative Mold Example 3

The plating was effected under the same pretreatment, plating bath composition and graphite conditions as those of Comparative Mold Example 2, but effecting the stirring at 850 rpm and maintaining a stirring and mold rotating interval of 4 second-on and second-off cycle.

Comparative Mold Example 4

The plating was effected under the same pretreatment, plating bath composition and graphite conditions as those of Mold Example 5, but without effecting the homogenization.

Comparative Mold Example 5

The plating was effected under the same pretreatment, plating bath composition and plating conditions as those of Mold Example 5 but using graphite that is described below.

| Graphite | Average particle size | 3 μm |
| --- | --- | --- |
| | Ash | 9000 ppm |
| | containing | |
| | $Fe_2O_3$ | 2600 ppm |
| | $SiO_2$ | 4500 ppm |
| | $Al_2O_3$ | 900 ppm |
| | CaO | 400 ppm |
| | MgO | 300 ppm |
| | $SO_4$ | 300 ppm |

The results obtained are tabulated below.

TABLE 1

| Example No. | Item | Dispersion of Ni As a whole | Dispersion of Ni Front side | Dispersion of Ni Inner side | Inclination angle of 30° or smaller (%) | Loss (%) under 550° C. × 24 H | Evaluation | Dispersion level of Ni | |
| --- | --- | --- | --- | --- | --- | --- | --- | --- | --- |
| Example No. 1 | Film thickness | 50 μm | | | | | A ① 54,000–117,000 | as a whole | A |
| | Ratio of smaller than 20 μm | 85% | 85% | 80% | | | ② 65,000 | inner side | A |
| | Number average flake length | 4 μm | 4 μm | 5 μm | 60 | 30 | ③ ⊙ | graphite inclination | good |
| | Ratio of smaller than 10 μm | 55% | 60% | 50% | | | | heat resistance | good |
| | Ratio of Ni area | 45% | 40% | 50% | | | | | |
| Example No. 2 | Film thickness | 45 μm | | | | | A ① 45,000–72,000 | as a whole | A |
| | Ratio of smaller than 20 μm | 70% | 75% | 50% | | | ② 54,000 | inner side | C |
| | Number average flake length | 8 μm | 6 μm | 14 μm | 50 | 30 | ③ ⊙ from first through up to about 26,000 times then ○, and then sproadically △. | graphite inclination | acceptable |
| | Ratio of smaller than 10 μm | 40% | 50% | 20% | | | | heat resistance | good |
| | Ratio of Ni area | 60% | 55% | 70% | | | | | |
| Example No. 3 | Film thickness | 50 μm | | | | | A ① 50,000–80,000 | as a whole | B |
| | Ratio of smaller than 20 μm | 65% | 65% | 60% | | | ② 59,000 | inner side | B |
| | Number average flake length | 12 μm | 12 μm | 13 μm | 60 | 30 | ③ ⊙ and sporadically ○ | graphite inclination | good |
| | Ratio of smaller than 10 μm | 35% | 35% | 35% | | | | heat resistance | good |
| | Ratio of Ni area | 55% | 55% | 55% | | | | | |
| Example No. 4 | Film thickness | 40 μm | | | | | A ① 43,000–60,000 | as a whole | C |
| | Ratio of smaller than 20 μm | 55% | 55% | 55% | | | ② 47,000 | inner side | C |
| | Number average flake length | 18 μm | 18 μm | 19 μm | 50 | 30 | ③ △ | graphite inclination | acceptable |
| | Ratio of smaller than 10 μm | 25% | 25% | 20% | | | | heat resistance | good |
| | Ratio of Ni area | 70% | 65% | 75% | | | | | |
| Example No. 5 | Film thickness | 50 μm | | | | | A ① 36,000–56,000 | as a whole | A |
| | Ratio of smaller than 20 μm | 75% | 75% | 70% | | | ② 45,000 | inner side | A |
| | Number average flake length | 8 μm | 7 μm | 9 μm | 50 | 45 | ③ ⊙ | graphite inclination | acceptable |
| | Ratio of smaller than 10 μm | 50% | 50% | 45% | | | | heat resistance | acceptable |
| | Ratio of | 55% | 50% | 60% | | | | | |

TABLE 1-continued

| Example No. | Item | Dispersion of Ni As a whole | Dispersion of Ni Front side | Dispersion of Ni Inner side | Inclination angle of 30° or smaller (%) | Loss (%) under 550° C. × 24 H | Evaluation | Dispersion level of Ni | |
|---|---|---|---|---|---|---|---|---|---|
| Example No. 6 | Film thickness | 55 μm | | | | | A ① 54,000–68,000 | as a whole | B |
| | Ratio of smaller than 20 μm | 65% | 70% | 65% | | | ② 60,000 | inner side | B |
| | Number average flake length | 10 μm | 9 μm | 12 μm | 70 | 20 | ③ ⊙ and sporadically ○. | graphite inclination | good |
| | Ratio of smaller than 10 μm | 40% | 45% | 35% | | | | heat resistance | excellent |
| | Ratio of Ni area | 55% | 50% | 55% | | | | | |
| Comparative Example No. 1 | Film thickness | 40 μm | | | | | A ① 28,000–54,000 | as a whole | D |
| | Ratio of smaller than 20 μm | 40% | 40% | 40% | | | ② 32,000 | inner side | D |
| | Number average flake length | 24 μm | 23 μm | 26 μm | 40 | 30 | ③ X | graphite inclination | poor |
| | Ratio of smaller than 10 μm | 15% | 15% | 15% | | | | heat resistance | good |
| | Ratio of Ni area | 80% | 80% | 80% | | | | | |
| Comparative Example No. 2 | Film thickness Ratio of smaller than 20 μm Number average flake length Ratio of smaller than 10 μm Ratio of Ni area | | | | Plating is defective (normal plating is not accomplished due to local deposition of graphite). | | | | |
| Comparative Example No. 3 | Film thickness | 45 μm | | | | | A ① 34,000–63,000 | as a whole | D |
| | Ratio or smaller than 20 μm | 45% | 50% | 40% | | | ② 50,000 | inner side | D |
| | Number average flake length | 21 μm | 19 μm | 26 μm | 60 | 25 | ③ Δ From first to 20,000 times, and then X. | graphite inclination | good |
| | Ratio of smaller than 10 μm | 20% | 25% | 15% | | | | heat resistance | good |
| | Ratio of Ni area | 60% | 50% | 80% | | | | | |
| Comparative Example No. 4 | Film thickness | 55 μm | | | | | A ① 22,000–49,000 | as a whole | A |
| | Ratio of smaller than 20 μm | 70% | 70% | 65% | | | ② 29,000 | inner side | B |
| | Number average flake length | 9 μm | 8 μm | 11 μm | 40 | 45 | ③ ⊙ and sporadically ○. | graphite inclination | poor |
| | Ratio of smaller than 10 μm | 45% | 45% | 40% | | | | heat resistance | acceptable |
| | Ratio of Ni area | 50% | 40% | 65% | | | | | |
| Comparative Example No. 5 | Film thickness | 50 μm | | | | | A ① 24,000–54,000 | as a whole | A |
| | Ratio of smaller than 20 μm | 75% | 75% | 70% | | | ② 27,000 | inner side | A |
| | Number average | 8 μm | 7 μm | 9 μm | 60 | 55 | ③ ⊙ | graphite inclination | good |

TABLE 1-continued

| Example No. | Item | Dispersion of Ni As a whole | Dispersion of Ni Front side | Dispersion of Ni Inner side | Inclination angle of 30° or smaller (%) | Loss (%) under 550° C. × 24 H | Evaluation | Dispersion level of Ni |
|---|---|---|---|---|---|---|---|---|
| | flake length Ratio of smaller than 10 μm | 50% | 50% | 45% | | | heat resistance | poor |
| | Ratio of Ni area | 55% | 50% | 60% | | | | |

Evaluation A: Evaluated using molds for molding 100 ml beverage bottles,

① The number of times of molding until wrinkles and lines develop (min. number of times of molding to max. number of times of molding using 20 molds).

② Average number of times of molding.

③ Evaluation of fine scars on the bottle surfaces.

⊚ Did not at all develop.

○ Develop to a slight degree without imposing any problem

Δ Not acceptable to those that strictly require good appearance.

× Rejected through an inspecting machine.

According to the present invention as will be obvious from the results of the above working examples, the water-soluble high molecules can be made present as a dispersing agent in the dispersion coating bath of a solution of a water-soluble nickel salt in which graphite is dispersed. It is therefore allowed to suppress the growth of nickel or nickel-based alloy in the film in the vertical direction or in the direction of the plane thereof, and to form a film of a novel fine structure comprising (1) a matrix of nickel or nickel-based alloy (hereinafter simply referred to as nickel) which as a whole is in a thin flake-like form and is continuous and having an open cellular form and (2) a graphite granule phase which is held in the open cells and is outwardly exposed on the surface, on the surfaces of the mold for molding a glass. The film has excellent lubricating property, heat resistance, parting property, abrasion resistance and durability in combination, and makes it possible to stably produce molded articles of a glass having very smooth and excellent appearance without even fine scars for extended periods of time.

We claim:

1. A mold for molding glass, the mold having inner surfaces which are coated with a film of nickel with graphite granules or with a film of a nickel-based alloy comprising chiefly nickel with graphite granules, wherein the coated film comprises:

(1) a matrix of nickel or a nickel-based alloy which is in the form of flakes and is continuous as a whole in a direction perpendicular to the surface of the mold or further in a direction of the plane of said surface of the mold, but exists in the form of open cells, and (2) a graphite granule phase that is held in said open cells and is outwardly exposed on a surface of the film;

wherein the matrix of nickel or the nickel-based alloy that exists in the form of open cells is suppressed from growing in the perpendicular direction or in the direction of the plane of said surface of the mold, and is present in the form of thin flakes so that the thin flakes have a grain size distribution such that at least 50 number percent of the flakes are not more than 20 μm long and that greater than 20 number percent of the flakes are smaller than 10 μm long when measured in the direction perpendicular to said surface of the mold or in the direction of the plane of said surface of the mold.

2. A mold for molding a glass according to claim 1, wherein said nickel or said nickel-based alloy occupies 20 to 70% of an area on a cross section of the film.

3. A mold for molding a glass according to claim 1, wherein the graphite granules are distributed in a number percent of greater than 50 having an angle of inclination of a graphite plane of smaller than 30 degrees from the surface of the film.

4. A mold for molding a glass according to claim 1, wherein the graphite granules are highly purified to contain ash components in amounts smaller than 100 ppm.

5. A mold for molding a glass according to claim 1, wherein the graphite has a loss of weight less than 50% when the graphite is exposed to open air heated at 550° C. for 24 hours.

6. A mold for molding glass, the mold having inner surfaces which are coated with nickel with graphite granules or with a nickel-based alloy with graphite granules, thereby forming a film on said inner surface, wherein said film comprises:

(1) a nickel or a nickel-based alloy matrix which is present in the form of thin flakes and is continuous as a whole but is present in the form of open cells; and (2) a graphite granule phase that is held in said open cells and is outwardly exposed on a surface, wherein at least 50 percent of the total number of said thin flakes are not more than 20 μm in length in a direction of the plane of the surface of said mold or in a direction perpendicular to the plane of the surface of the mold, said matrix occupying 70 to 20 percent of an area on a cross section of the film, and the graphite having a particle size of from 0.3 to 20 μm.

* * * * *